US008565055B2

(12) United States Patent
Kobayashi et al.

(10) Patent No.: US 8,565,055 B2
(45) Date of Patent: Oct. 22, 2013

(54) METHOD OF, AND APPARATUS FOR, RECORDING ADDRESS INFORMATION TO DISC MEDIUM

(75) Inventors: Shoei Kobayashi, Kanagawa (JP);
Nobuyoshi Kobayashi, Kanagawa (JP);
Tamotsu Yamagami, Kanagawa (JP);
Shinichiro Iimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/529,197

(22) Filed: Jun. 21, 2012

(65) Prior Publication Data
US 2012/0257485 A1     Oct. 11, 2012

Related U.S. Application Data

(60) Continuation of application No. 13/109,466, filed on May 17, 2011, now Pat. No. 8,270,267, which is a continuation of application No. 12/183,789, filed on Jul. 31, 2008, now Pat. No. 7,965,604, which is a continuation of application No. 11/488,751, filed on Jul. 19, 2006, now Pat. No. 7,414,932, which is a division of application No. 10/276,383, filed as application No. PCT/JP02/02615 on Mar. 19, 2002, now Pat. No. 7,274,635.

(30) Foreign Application Priority Data

Mar. 19, 2001 (JP) ................................ 2001-078239
Jun. 6, 2001 (JP) ................................ 2001-170610

(51) Int. Cl.
*G11B 7/00* (2006.01)
(52) U.S. Cl.
USPC .................. 369/47.22; 369/47.19; 369/47.28

(58) Field of Classification Search
USPC ............................................ 369/59.22, 47.22
See application file for complete search history.

(56) References Cited

U.S. PATENT DOCUMENTS 5,825,733 A    10/1998  Ogawa
5,959,619 A *   9/1999  Kameyama et al. .......... 345/204
(Continued)

FOREIGN PATENT DOCUMENTS

JP        58-169341        10/1983
JP        61-29455         2/1986
(Continued)

OTHER PUBLICATIONS

Japanese Office Action issued Oct. 20, 2011, in Japanese Application No. 2011-087234 (with English Translation).
(Continued)

*Primary Examiner* — Van Chow
(74) *Attorney, Agent, or Firm* — Oblon, Spivak, McClelland, Maier & Neustadt, L.L.P.

(57) ABSTRACT

In step S1, the address generator generates address information composed of a sync signal which is recorded on an optical disc, address data and an error correction code for the address data, pre-encodes and supplies it to a modulator. At the same time, a carrier signal generator generates a carrier signal which is to carry the address information, and supplies it to the modulator. In step S2, the modulator makes MSK modulation of the carrier signal supplied from the carrier signal generator on the basis of the pre-encoded address information supplied from the address generator, and supplies a resultant MSK modulation signal to a wobbling unit. In step S3, the wobbling unit forms, on the optical disc, a spiral groove wobbled adaptively to the MSK modulation signal supplied from the modulator. In this optical disc, a given address can be accessed quickly and accurately.

5 Claims, 15 Drawing Sheets

(56) References Cited

U.S. PATENT DOCUMENTS

| | | | |
|---|---|---|---|
| 5,963,519 A | 10/1999 | Kim | |
| 6,160,776 A | 12/2000 | Seo | |
| 6,377,537 B1 | 4/2002 | Maeda et al. | |
| 7,236,435 B2 | 6/2007 | Kobayashi | |
| 8,254,226 B2 | 8/2012 | Iimura et al. | |
| 8,270,267 B2 * | 9/2012 | Kobayashi et al. | ........ 369/47.22 |
| 2003/0165095 A1 | 9/2003 | Iimura et al. | |
| 2003/0174603 A1 | 9/2003 | Schep et al. | |
| 2004/0156291 A1 | 8/2004 | Heemskerk et al. | |

FOREIGN PATENT DOCUMENTS

| | | |
|---|---|---|
| JP | 61-168173 | 7/1986 |
| JP | 1-151082 | 6/1989 |
| JP | 2-285564 | 11/1990 |
| JP | 3-83232 | 4/1991 |
| JP | 4-26959 | 1/1992 |
| JP | 4-90169 | 3/1992 |
| JP | 4-357737 | 12/1992 |
| JP | 5-102958 | 4/1993 |
| JP | 8-212715 | 8/1996 |
| JP | 8-256185 | 10/1996 |
| JP | 11-45441 | 2/1999 |
| JP | 2000-270029 | 9/2000 |
| JP | 2000-311448 | 11/2000 |
| JP | 2001-34952 | 2/2001 |
| JP | 2002-535801 | 10/2002 |
| WO | WO 00/43996 | 7/2000 |

OTHER PUBLICATIONS

Office Action issued Jan. 17, 2012, in Japanese Patent Application No. 2010-106583, (with English-language Translation).

Office Action issued Feb. 8, 2011, in Japanese Patent Application No. 2010-106583.

Office Action issued on Aug. 7, 2012, in Japanese Patent Application No. 2010-106583.

Jan J.L.M. van Vlerken, et al., "Format Detection for DVD+ReWritable 4.7GB", WAM 11.5, 2000 IEEE, pp. 162-163.

* cited by examiner

MSK
FIG.4A  Carrier  
FIG.4B  "0"  
FIG.4C  "1"  

"1"　　"0"　　"1"　　"0"

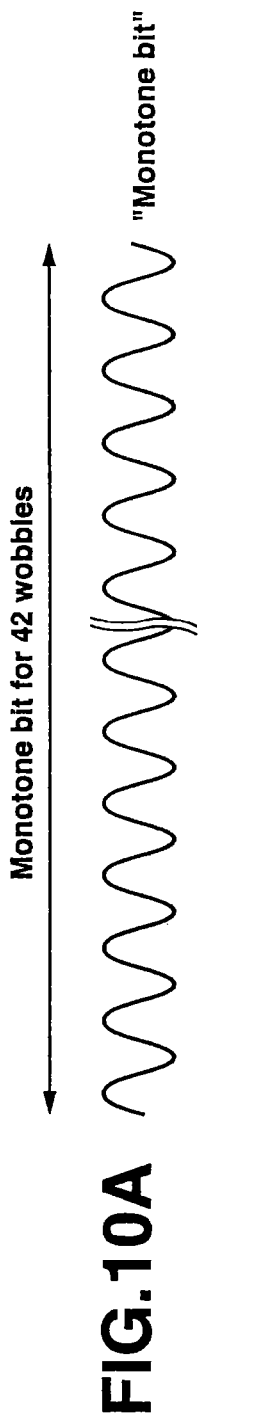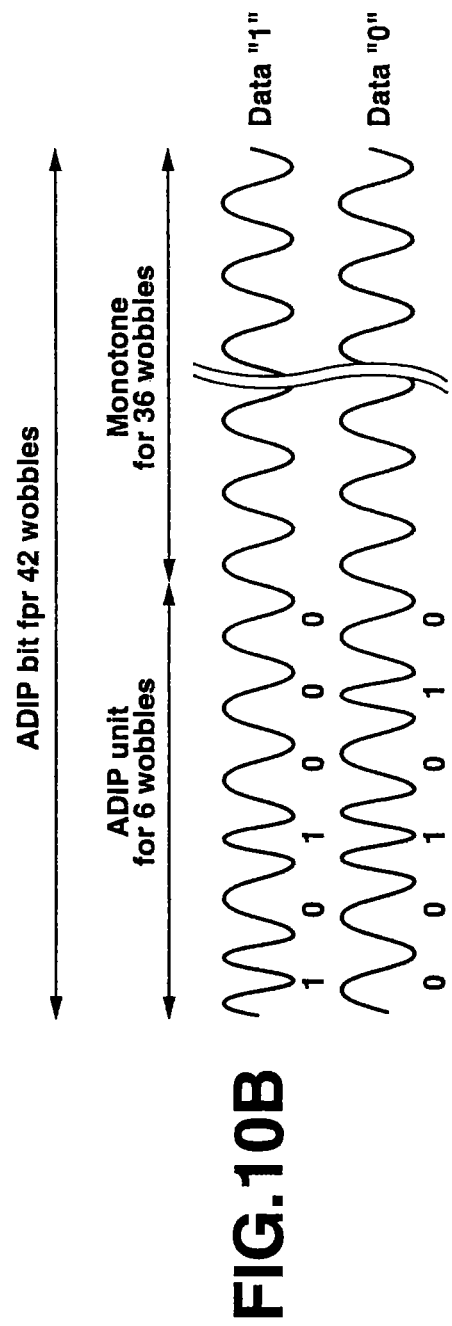
FIG.10A
FIG.10B

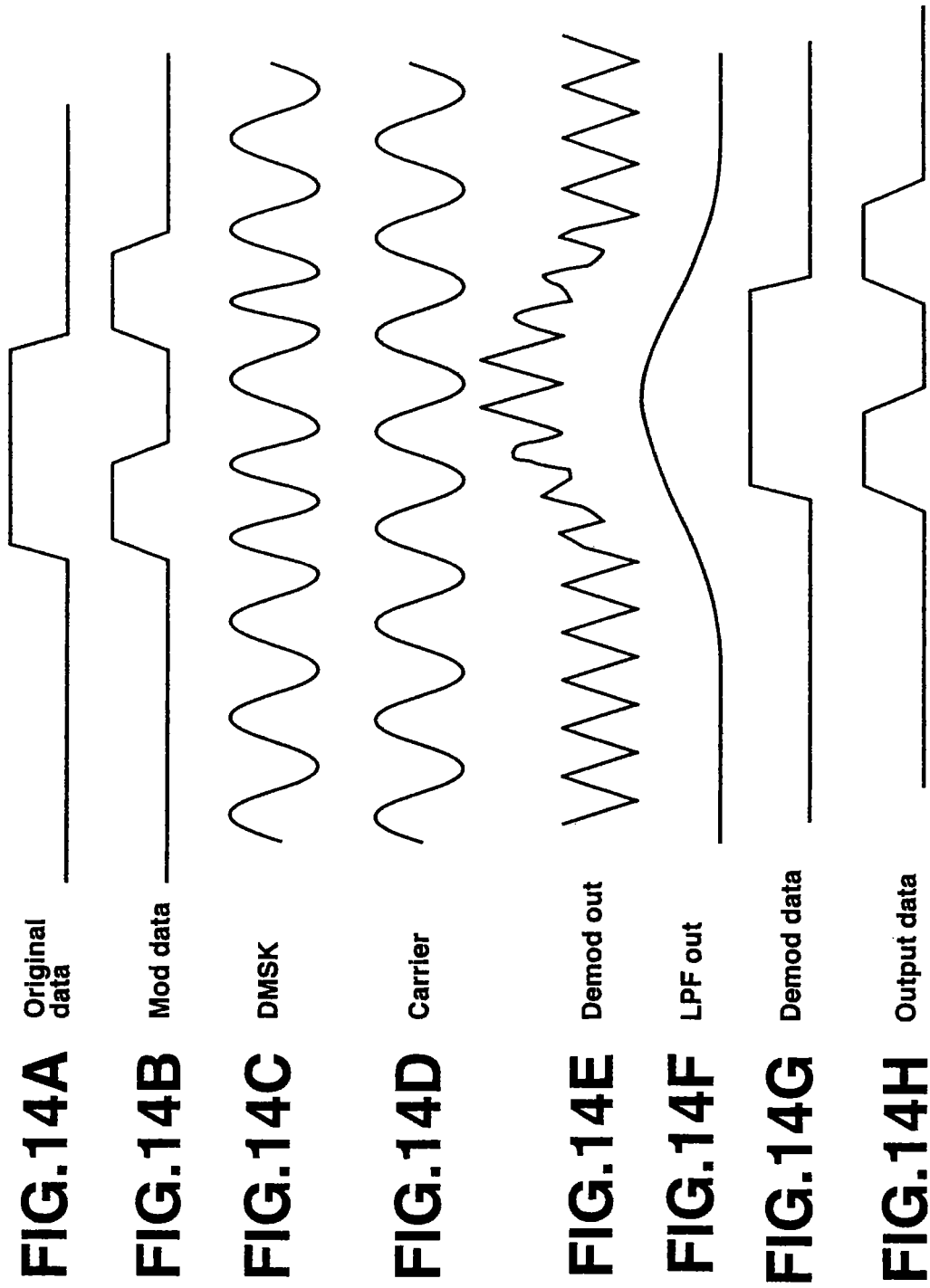

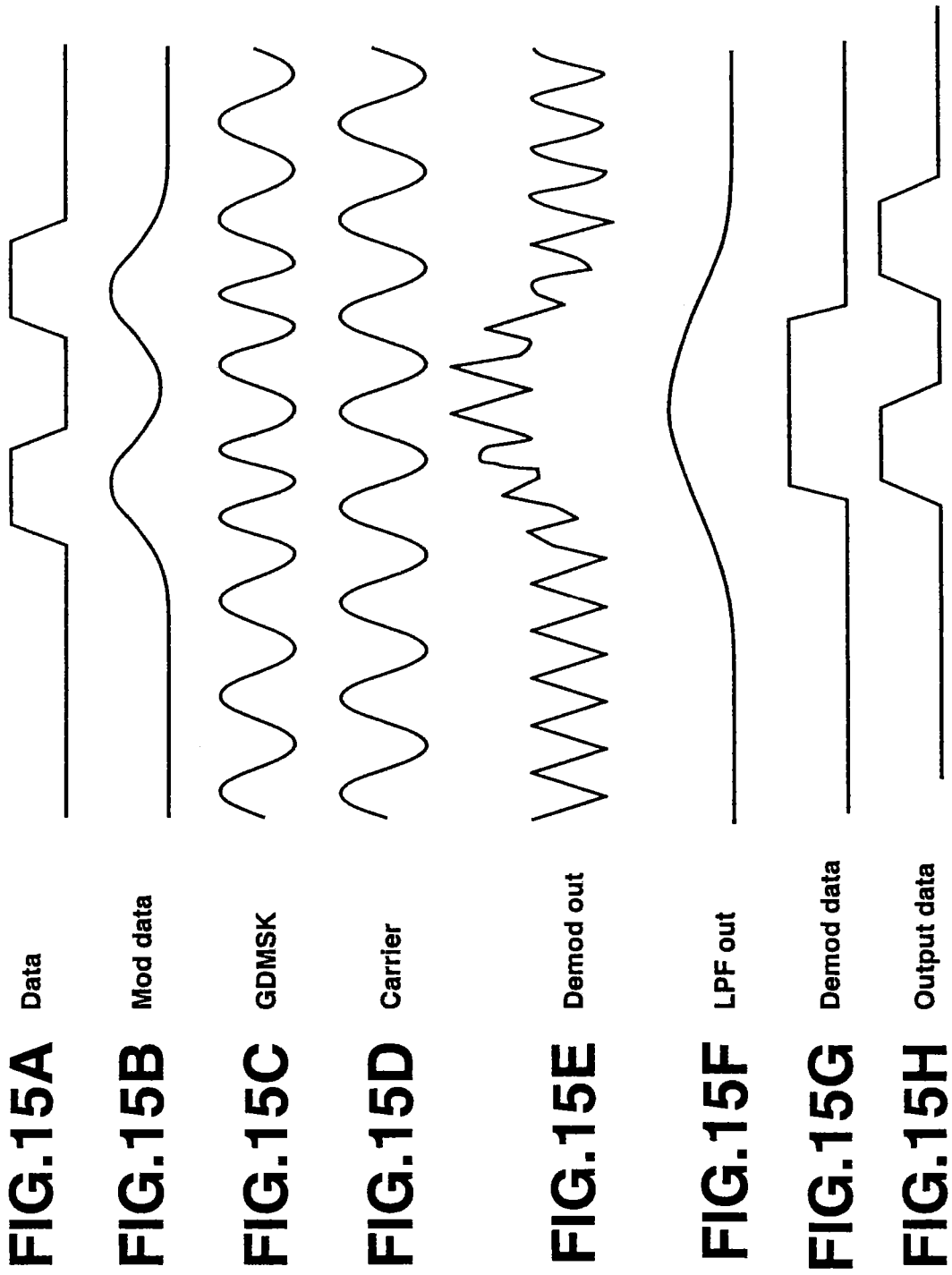

METHOD OF, AND APPARATUS FOR, RECORDING ADDRESS INFORMATION TO DISC MEDIUM

CROSS-REFERENCE TO RELATED APPLICATIONS

The present application is a continuation of U.S. application Ser. No. 13/109,466 filed May 17, 2011, which is a continuation of U.S. application Ser. No. 12/183,789 filed Jul. 31, 2008, which is a continuation of U.S. application Ser. No. 11/488,751 filed Jul. 19, 2006, which is a divisional of U.S. application Ser. No. 10/276,383 filed on Nov. 15, 2002, and in turn claims priority to JP 2001-078239 filed on Mar. 19, 2001, JP 2001-170610 filed on Jun. 6, 2001, and PCT/JP02/02615 filed on Mar. 19, 2002, the entire contents of each of which are hereby incorporated herein by reference.

TECHNICAL FIELD

The present invention generally relates to a recording method and apparatus, a reproducing method and apparatus, recording medium, program and a disc medium, and more particularly to a method of, and apparatus for, recording address information as wobbles of a groove to a disc medium, a method of, and apparatus for, reproducing address information recorded as wobbles of a groove on a disc medium, a recording medium having recorded therein a program for the address information recording and reproduction, the program, and a disc medium having such a groove formed thereon.

BACKGROUND ART

Heretofore, a disc medium such as an optical disc, magnetic disc, magneto-optical disc or the like has a spiral groove formed thereon for the purpose of tracking. It is already known to record address information by wobbling the groove adaptively to the address information.

For example, a CD-R (compact disc—Recordable) and MD (mini-disc) has formed thereon a spiral groove wobbled adaptively to an FM-modulated carrier signal (will be referred to as "FM modulation signal" hereunder) on the basis of address information. With the wobbles of the groove adaptively to the FM modulation signal, however, address information cannot be detected with a high accuracy and a given address cannot be accessed with a high accuracy when recording data to a disc medium and for reproducing data recorded in a disc medium. Therefore, for recording data to a disc medium, a very large link area (where no data is to be written) has to be provided before and after the data, which leads to a waste use of the recording area of the disc medium.

DISCLOSURE OF THE INVENTION

Accordingly, the present invention has an object to overcome the above-mentioned drawbacks of the related art by providing a recording apparatus and method, reproducing apparatus and method, recording medium, program and a disc medium, which make it possible to access a given address quickly and accurately through accurate reproduction of address information.

The above object can be attained by providing an apparatus for recording address information to a disc medium, the apparatus including according to the present invention:

means for generating address information composed of a sync signal including a plurality of sync unit patterns, address data and an error correction code for the address data;

means for making MSK modulation of a carrier signal correspondingly to the address information generated by the address information generating means to generate an MSK modulation signal; and means for forming, on the disc medium, a spiral groove wobbled adaptively to the MSK modulation signal generated by the modulating means.

In the above recording apparatus, an optical disc may be used as the disc medium. Also, the modulating means may generate an MSK modulation signal consisting of a non-modulated part and a modulated part by making MSK modulation of the carrier signal correspondingly to the address information generated by the address information generating means. The frequency of the non-modulated part of the MSK modulation signal may be the same as that of the carrier signal while the frequency of the modulated part of the MSK modulation may be 1.5 times higher than that of the carrier signal. Also, correspondingly to 1-bit data "0" of the address information, the modulating means may generate an MSK modulation signal having a non-modulated part and modulated part allocated in a first order, and correspondingly to 1-bit data "1" of the address information, and an MSK modulation signal of a second pattern having a non-modulated part and modulated part allocated in a second order.

Also, the above object can be attained by providing a method for recording address information to a disc medium, the method including, according to the present invention:

a generating step of generating address information composed of a sync signal including a plurality of sync unit patterns, address data and an error correction code for the address data;

a modulation step of making MSK modulation of a carrier signal correspondingly to the address information generated by the address information generating means to generate an MSK modulation signal; and a forming step of forming, on the disc medium, a spiral groove wobbled adaptively to the MSK modulation signal generated by the modulating means.

Also, the above object can be attained by providing a recording medium having a computer-readable program for recording address information to a disc medium, the program including, according to the present invention:

a generating step of generating address information composed of a sync signal including a plurality of sync unit patterns, address data and an error correction code for the address data;

a modulation step of making MSK modulation of a carrier signal correspondingly to the address information generated by the address information generating means to generate an MSK modulation signal; and a forming step of forming, on the disc medium, a spiral groove wobbled adaptively to the MSK modulation signal generated by the modulating means.

Also, the above object can be attained by providing a program for causing a computer, which controls operations for recording address information to a disc medium, to execute, according to the present invention:

a generating step of generating address information composed of a sync signal including a plurality of sync unit patterns, address data and an error correction code for the address data;

a modulation step of making MSK modulation of a carrier signal correspondingly to the address information generated by the address information generating means to generate an MSK modulation signal; and a forming step of forming, on the disc medium, a spiral groove wobbled adaptively to the MSK modulation signal generated by the modulating means.

Also, the above object can be attained by providing an apparatus for reproducing an address on a disc medium on the basis of wobbles of a groove formed on the disc medium, the apparatus including according to the present invention:

radiating means for radiating laser light to the disc medium;

return light detecting means for detecting return light from the disc medium to generate a return light signal corresponding to the return light thus detected;

wobbling signal generating means for generating a wobbling signal corresponding to the wobbles of the groove on the basis of the return light signal generated by the return light detecting means;

extracting means for extracting an MSK modulation signal by removing a noise component from the wobbling signal generated by the wobbling signal generating means;

demodulating means for demodulating the MSK modulation signal to recover address information composed of a sync signal including a plurality of sync unit patterns, address data and an error correction code for the address data;

sync unit pattern detecting means for detecting at least one of the plurality of sync unit patterns included in the sync signal in the address information recovered by the demodulating means;

acquiring means for acquiring the address data and error correction code for the address data from the address information on the basis of the position of the sync unit pattern detected by the sync unit pattern detecting means; and reproducing means for reproducing the address on the basis of the address data and the error correction code for the address data, acquired by the acquiring means.

Note that in this address information reproducing apparatus, an optical disc can be used as the disc medium.

Also, the above object can be attained by providing a method for reproducing an address on a disc medium on the basis of wobbles of a groove formed on the disc medium, the method including, according to the present invention:

a radiating step of radiating laser light to the disc medium;

a return light detecting step of detecting return light from the disc medium to generate a return light signal corresponding to the return light thus detected;

a wobbling signal generating step of generating a wobbling signal corresponding to the wobbles of the groove on the basis of the return light signal generated in the return light detecting step;

an extracting step of extracting an MSK modulation signal by removing a noise component from the wobbling signal generated in the wobbling signal generating step;

a demodulating step of demodulating the MSK modulation signal to recover address information composed of a sync signal including a plurality of sync unit patterns, address data and an error correction code for the address data;

a sync unit pattern detecting step of detecting at least one of the plurality of sync unit patterns included in the sync signal in the address information recovered in the demodulating step;

an acquiring step of acquiring the address data and error correction code for the address data from the address information on the basis of the position of the sync unit pattern detected in the sync unit pattern detecting step; and a reproducing step of reproducing the address on the basis of the address data and the error correction code for the address data, acquired in the acquiring step.

Also, the above object can be attained by providing a recording medium having recorded therein a computer-readable program including, according to the present invention:

a radiating step of radiating laser light to the disc medium;

a return light detecting step of detecting return light from the disc medium to generate a return light signal corresponding to the return light thus detected;

a wobbling signal generating step of generating a wobbling signal corresponding to the wobbles of the groove on the basis of the return light signal generated in the return light detecting step;

an extracting step of extracting an MSK modulation signal by removing a noise component from the wobbling signal generated in the wobbling signal generating step;

a demodulating step of demodulating the MSK modulation signal to recover address information composed of a sync signal including a plurality of sync unit patterns, address data and an error correction code for the address data;

a sync unit pattern detecting step of detecting at least one of the plurality of sync unit patterns included in the sync signal in the address information recovered in the demodulating step;

an acquiring step of acquiring the address data and error correction code for the address data from the address information on the basis of the position of the sync unit pattern detected in the sync unit pattern detecting step; and a reproducing step of reproducing the address on the basis of the address data and the error correction code for the address data, acquired in the acquiring step.

Also, the above object can be attained by providing a program for causing a computer, which controls operations for reproducing an address on a disc medium on the basis of wobbles of a groove formed on the disc medium, to execute, according to the present invention:

a radiating step of radiating laser light to the disc medium;

a return light detecting step of detecting return light from the disc medium to generate a return light signal corresponding to the return light thus detected;

a wobbling signal generating step of generating a wobbling signal corresponding to the wobbles of the groove on the basis of the return light signal generated in the return light detecting step;

an extracting step of extracting an MSK modulation signal by removing a noise component from the wobbling signal generated in the wobbling signal generating step;

a demodulating step of demodulating the MSK modulation signal to recover address information composed of a sync signal including a plurality of sync unit patterns, address data and an error correction code for the address data;

a sync unit pattern detecting step of detecting at least one of the plurality of sync unit patterns included in the sync signal in the address information recovered in the demodulating step;

an acquiring step of acquiring the address data and error correction code for the address data from the address information on the basis of the position of the sync unit pattern detected in the sync unit pattern detecting step; and a reproducing step of reproducing the address on the basis of the address data and the error correction code for the address data, acquired in the acquiring step.

The disc medium according to the present invention has formed thereon a spiral groove wobbled adaptively to an MSK modulation signal corresponding to address information composed of a sync signal including a plurality of sync unit patterns, address data and an error correction code for the address data. It should be noted that an optical disc may be used as the disc medium.

In the above address information recording apparatus and method and program, there are generated address information composed of the sync signal including the plurality of sync unit patterns, address data and an error correction code for the address data, and a carrier signal is MSK-modulated correspondingly to the address information thus generated, to thereby generate an MSK modulation signal. Further, the groove wobbled adaptively to the MSK modulation signal thus generated is formed on a disc medium.

In the above address information reproducing apparatus and method and program, laser light is radiated to a disc medium, return light from the disc medium is detected, a return light signal is generated corresponding to the return light, and a wobbling signal corresponding to the wobbles of the groove is generated on the basis of the return light signal thus generated, a noise component is removed from the wobbling signal thus generated and an MSK modulation signal is extracted. Also, the MSK modulation signal thus extracted is demodulated to recover address information composed of a sync signal including a plurality of sync unit patterns, address data and an error correction code for the address data. Further, at least one of the sync unit patterns included in the sync signal of the address information thus recovered is detected, the address data and error correction code for the address data are acquired from the address information on the basis of the position of the sync unit pattern thus detected, and an address is reproduced based on the address data and error correction code for the address data, thus acquired.

Also, the above object can be attained by providing a disc medium having formed thereon according to the present invention, a spiral groove wobbled adaptively to an MSK modulation signal corresponding to address information composed of a sync signal including a plurality of sync unit patterns, address data and error correction code for the address data.

BRIEF DESCRIPTION OF THE DRAWINGS

FIGS. 10A and 10B show two different ADIP unit patterns.

FIGS. 14A to 14H explain together how a DMSK modulation signal is demodulated by the wobbling circuit.

FIGS. 15A to 15H explain together how a GMSK modulation signal is demodulated by the wobbling circuit

BEST MODE FOR CARRYING OUT THE INVENTION

Figure 1:
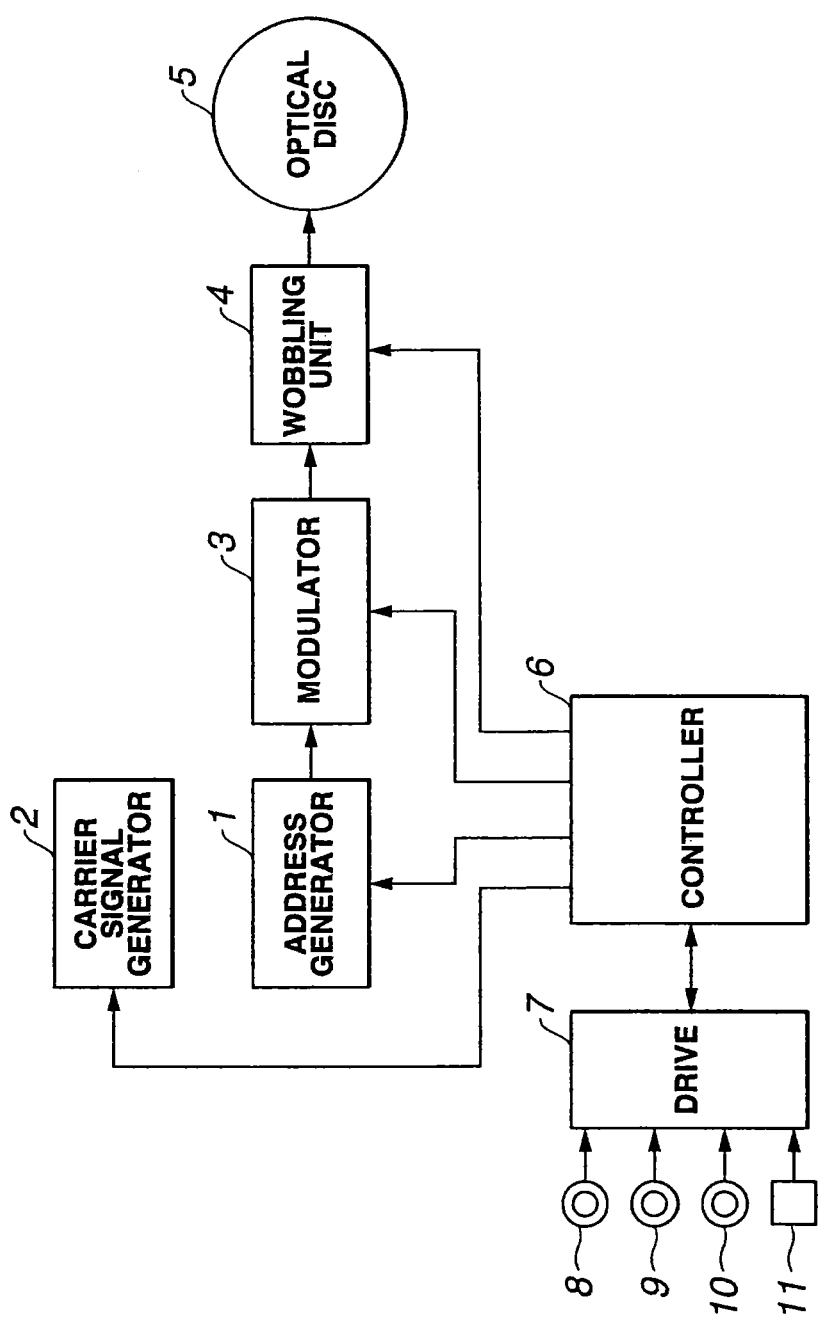
FIG. 1 is a block diagram of the address recording apparatus according to the present invention.
Figure 2:
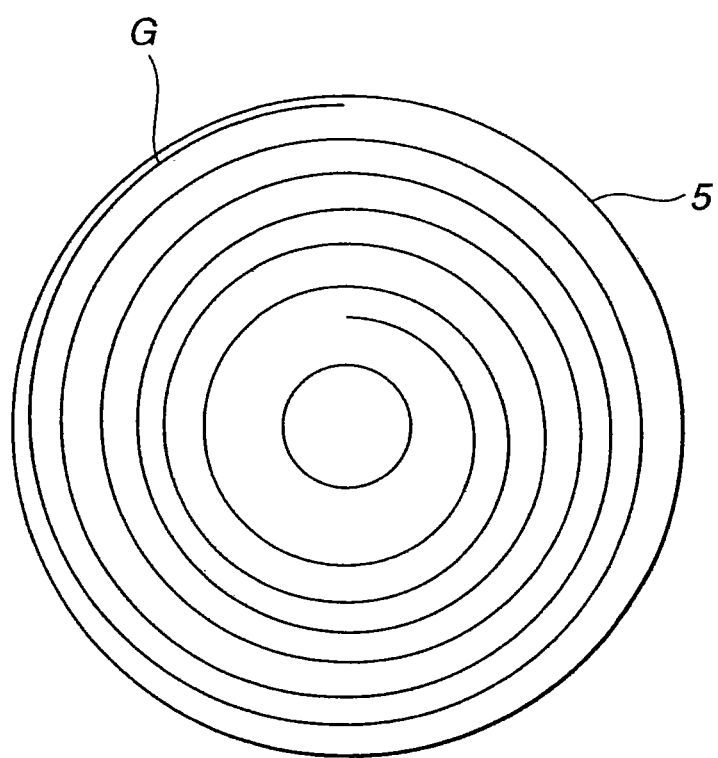
FIG. 2 is a plan view of an optical disc having a spiral groove formed thereon.
Figure 3:
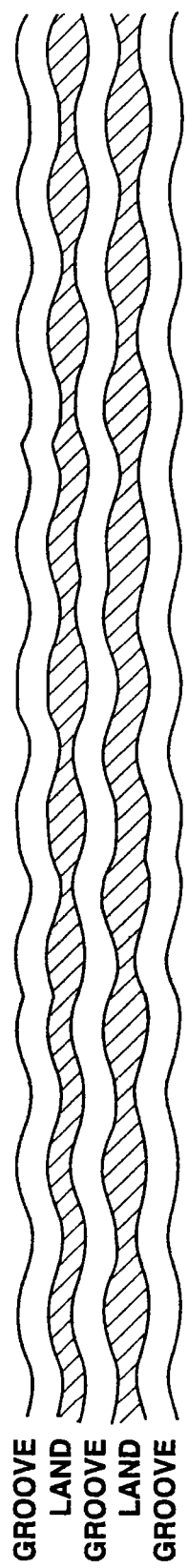
FIG. 3 is a plan view showing how the grooves are wobbled.

The recording apparatus and method, reproducing apparatus and method, recording medium, program and disc medium, according to the present invention will be described herebelow with reference to the accompanying drawings. The address recording apparatus according to the present invention is constructed as shown in FIG. 1. During production of an optical disc 5, the apparatus forms, on the optical disc 5, a groove G having a spiral form intended for tracking as shown in FIG. 2 and wobbled adaptively to address information as shown in FIG. 3.

As shown, the address recording apparatus according to the present invention includes an address generator 1. The address generator 1 generates address information indicating the position of address data and which is composed of a sync signal, address data and an error correction code (ECC) for the address data, pre-encodes and supplies it to a modulator 3. The address recording apparatus includes also a carrier signal generator 2 to generate a carrier, signal x(t) (=cos θ(t)) which is to carry the address information, and supplies the signal to the modulator 3.

Figure 4D:
FIG. 4 shows an MSK modulation signal composed of a non-modulated part and modulated part.

The modulator 3 is provided to make MSK (minimum shift keying) modulation of a carrier signal (as shown in FIG. 4A) supplied from the carrier signal generator 2, correspondingly to the pre-encoded address information supplied from the address generator 1, and supplies a resultant MSK modulation signal (as shown in FIGS. 4B to 4D) to a wobbling unit 4. It should be noted that the MSK modulation may be DMSK (differential minimum shift keying) modulation or GDMSK (Gausian filtered difference minimum shift keying) modulation.

Of the MSK modulation signal, a part for one cycle (will be referred to as "one wobble" hereunder), having the same frequency as that of the carrier signal as shown in FIG. 4B, corresponds to a code "0" of the pre-encoded address information. Also, of the MSK modulation signal, a part for 1.5 cycles (equal to one wobble of the carrier signal), having a frequency 1.5 times higher than that of the carrier signal, corresponds to a code "1" of the address information, as shown in FIG. 4C. Therefore, the MSK modulation signal as shown in FIG. 4D for example corresponds to a code "1010" of the pre-encoded address information.

Of the MSK modulation signal, a part having the same frequency as that of the carrier signal will be referred to as "non-modulated part" hereunder. Also, of the MSK modulation signal, a part having a frequency 1.5 times higher than that of the carrier signal will be referred to as "modulated part" hereunder. It should also be noted that the frequency of a modulated part will be described using a number of wobbles of a corresponding non-modulated part.

The wobbling unit 4 forms, on the optical disc 5, a spiral groove wobbled according to an MSK modulation signal supplied from the modulator 3.

Figure 5:
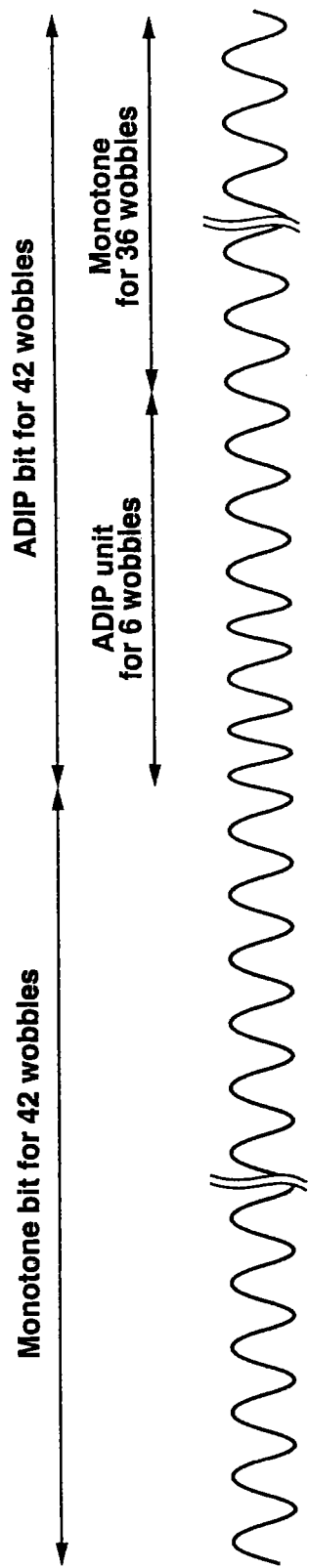
FIG. 5 shows how the groove is wobbled correspondingly to a monotone bit and ADIP bit.

Note that as shown in FIG. 5, address information of 1 bit is classified into a monotone bit including a first signal for 42 wobbles, and an ADIP (address in pre-groove) bit or the like including a second signal for 42 wobbles.

The address recording apparatus further includes a controller 6 to control a drive 7 to read a control program from a magnetic disc 8, optical disc 9, magneto-optical disc 10 or a semiconductor memory 11, and then control the entire address recording apparatus on the basis of the control program thus read.

Figure 6:
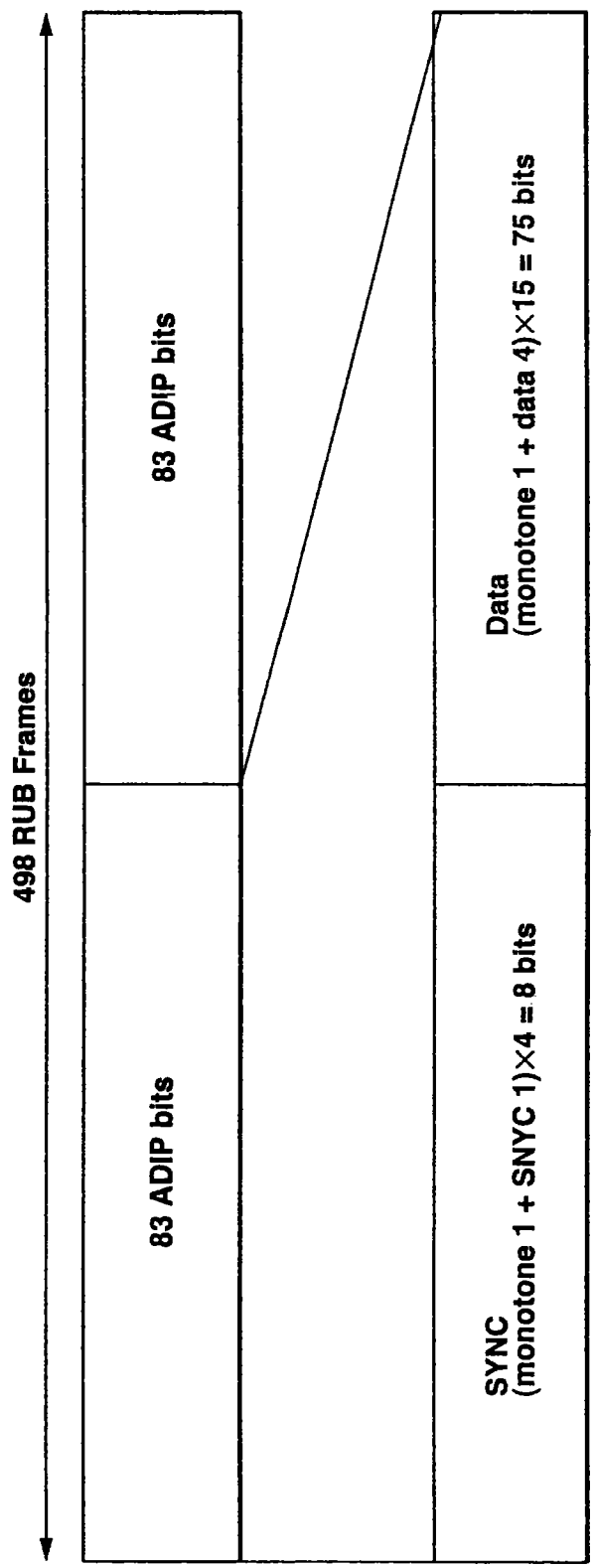
FIG. 6 shows the configuration of address information (ADIP) corresponding to a write-read cluster RUB.

FIG. 6 shows the configuration of address information recorded correspondingly to a write-read cluster RUB (recording unit block) of the optical disc 5. Two pieces of address information (ADIP) are recorded in the read-write cluster RUB. Each piece of address information is of 83 bits of which 8 bits are for a sync part (SYNC) indicating a sync signal, and 75 bits are for a data part indicating address data and ECC for the address data.

Figure 7:
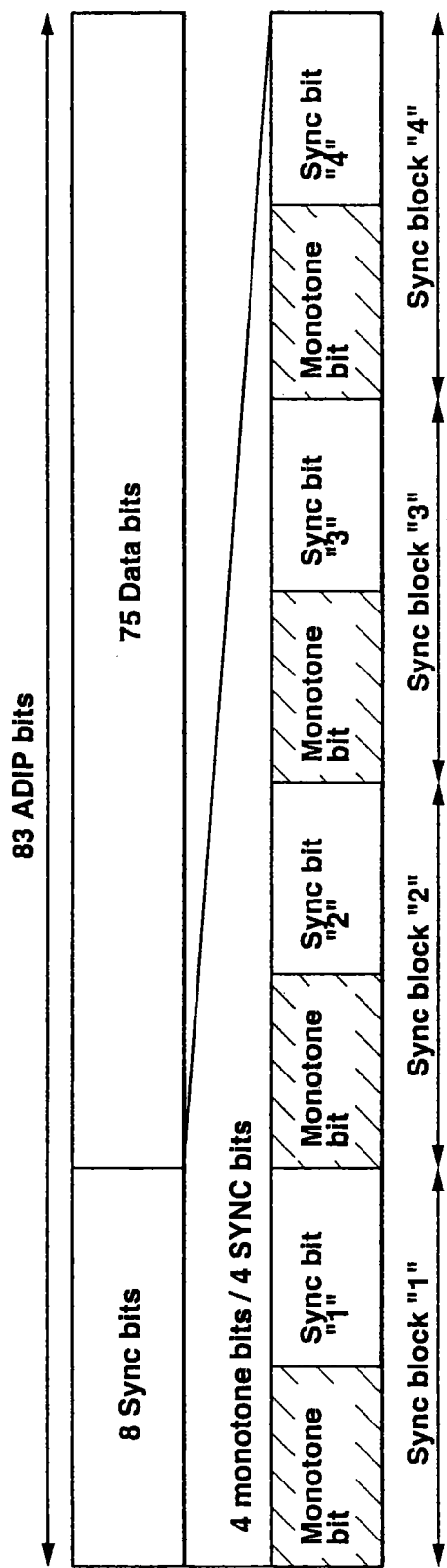
FIG. 7 shows the configuration of an 8-bit sync part.

FIG. 7 shows the configuration of a sync part of 8 bits. As shown, the sync part is composed of four sync blocks "1" to "4" each including a monotone bit and a sync bit.

As shown in FIGS. 8A to 8D, a sync bit (for 42 wobbles) is composed of a sync unit for 14 wobbles including the second signal and a monotone for 28 wobbles (first signal).

FIGS. 8A to 8D show wobbles for sync blocks "1" to "4", namely, an MSK modulation signal.

Figure 8:
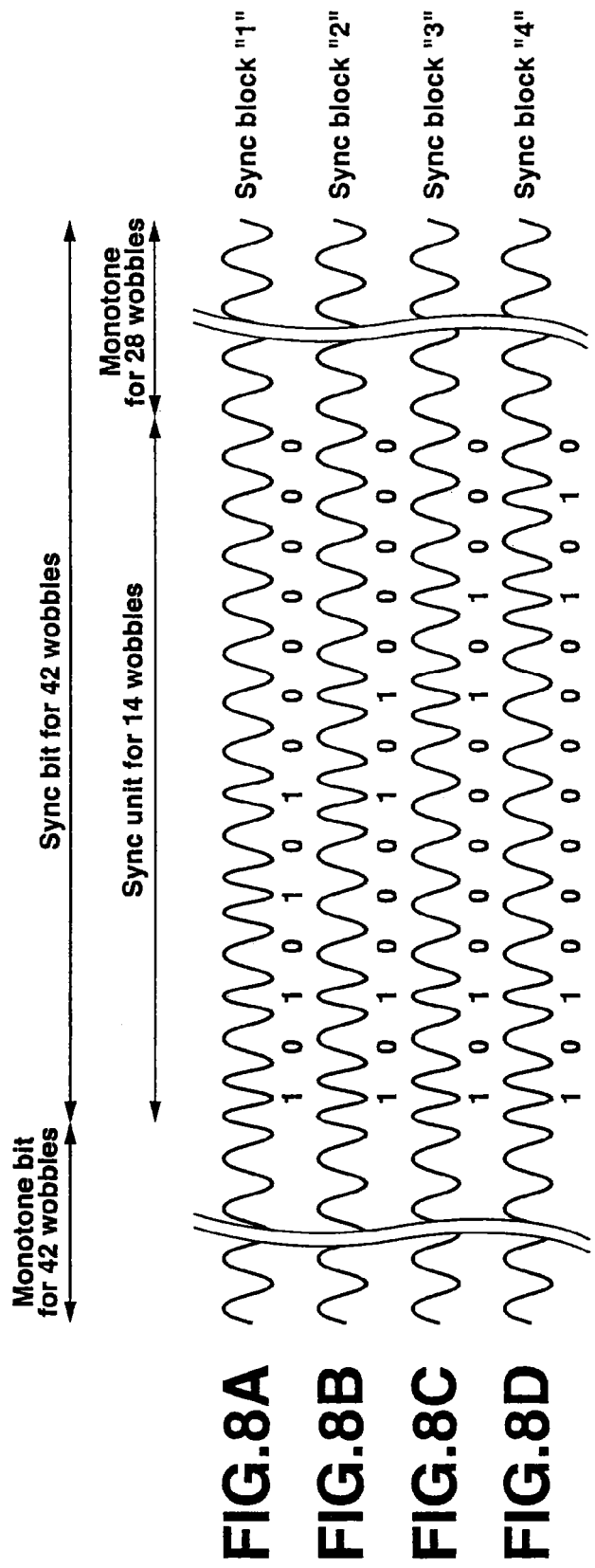
FIGS. 8A to 8D show four types of sync unit patterns included in the sync part.

The sync unit in the sync block "1" is formed as wobbles indicating a first sync unit pattern "10101010000000" as shown in FIG. 8A. The sync unit in the sync block "2" is formed as wobbles indicating a second sync unit pattern "10100010100000" as shown in FIG. 8B. The sync unit in the sync block "3" is formed as wobbles indicating a third sync unit pattern "10100000101000" as shown in FIG. 8C. The sync unit in the sync block "4" is formed as wobbles indicating a fourth sync unit pattern "10100000001010" as shown in FIG. 8D.

The sync part of 8 bits will include all the above-mentioned first to fourth sync unit patterns. For reproducing address information, when at least one of the first to fourth sync unit patterns can be reproduced, the position of the sync part, that is, the address information, can accurately be determined.

Figure 9:
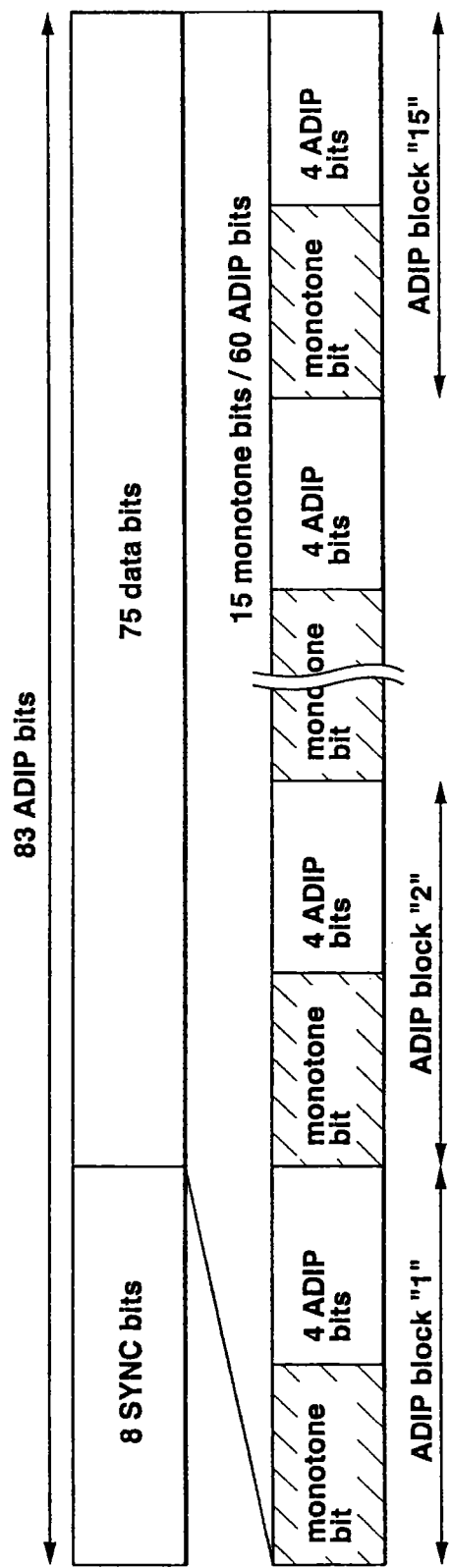
FIG. 9 shows the configuration of a 75-bit data part.

FIG. 9 shows the configuration of the 75-bit data part. As will be seen from FIG. 9, the data part includes fifteen ADIP blocks "1" to "15" each composed of a monotone bit and four ADIP bits.

As shown in FIG. 10A, one monotone bit forming a part of each ADIP block consists of a non-modulated part for 42 wobbles. FIG. 10B shows that one of the four ADIP bits forming each ADIP block consists of an ADIP unit for 6 wobbles including a modulated part, and a non-modulated part for 36 wobbles.

The ADIP unit for 6 wobbles including the modulated part includes first and second ADIP unit patterns.

The ADIP unit in the ADIP bit, equivalent to 1-bit digital data "1" in the address data in the address information, consists of the first ADIP unit pattern "101000". Also, the ADIP unit in the ADIP bit, equivalent to 1-bit digital data "0" in the address data in the address information consists of the second ADIP unit pattern "001010".

Figure 11:
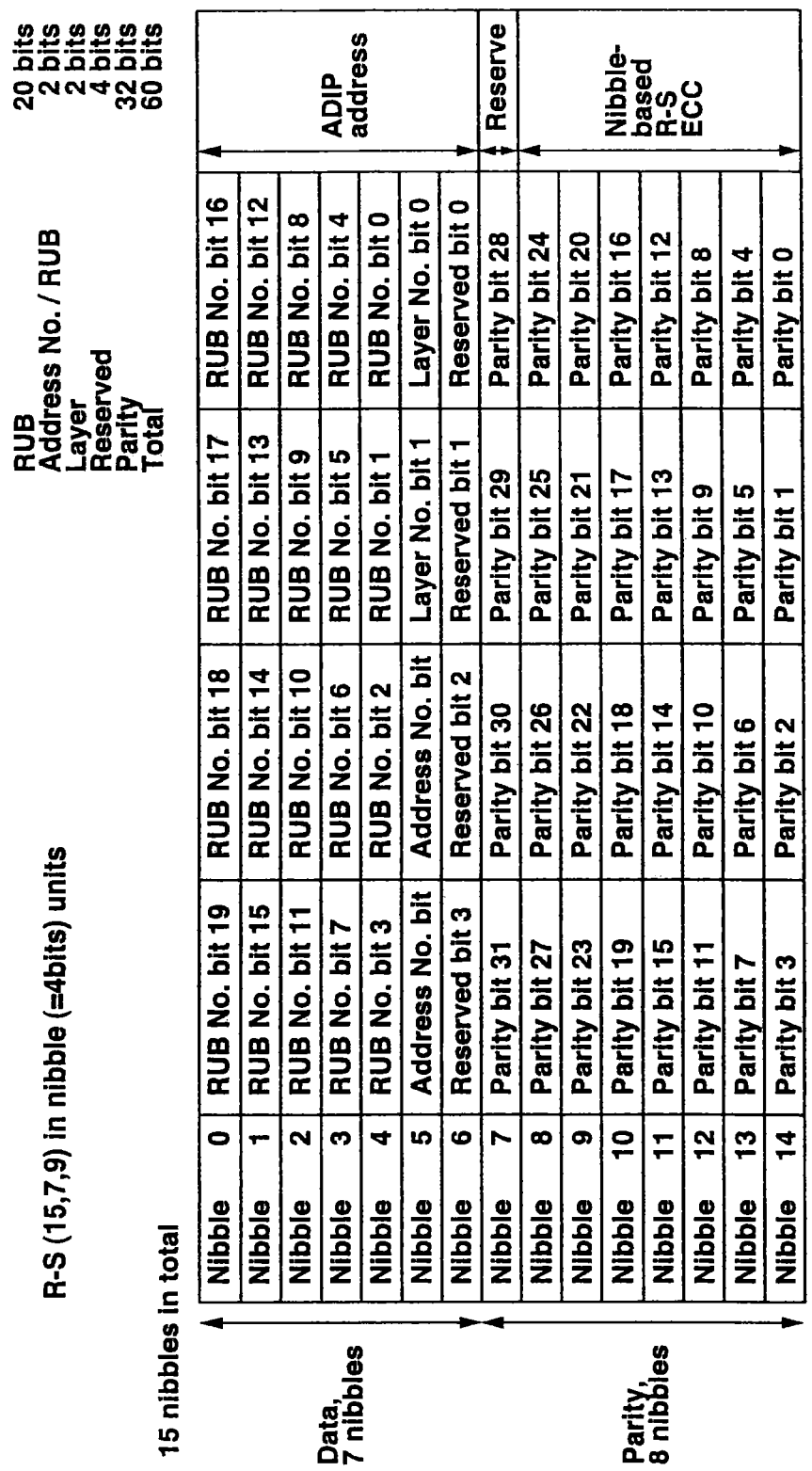
FIG. 11 explains an error correction code for address data.

FIG. 11 shows address data and an ECC for the address data. As shown, an ECC (parity) of 32 bits (=8 nibbles) is added to address data of 28 bits (=7 nibbles). It should be noted that the 28-bit address data includes a 20-bit RUB number, 2-bit RUB address number, 2-bit information for a multilayer disc and a four reserved bits. The error correction method is the nibble-based Reed-Solomon Coding RS (15, 7, 9).

Figure 12:
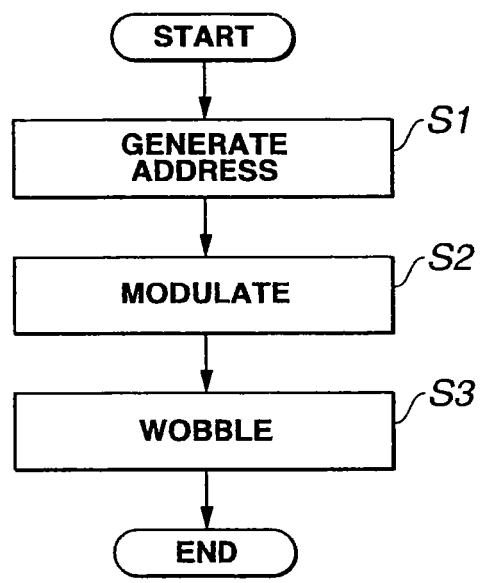
FIG. 12 shows a flow of operations made in recording an address in the address recording apparatus.

Referring now to FIG. 12, there is illustrates in the form of a flow chart operations made for recording of address information in the address recording apparatus according to the present invention. The address recording will be described below with reference to FIG. 12.

In step S1 shown in FIG. 12, the address generator 1 generates address information which is to be recorded to the optical disc 5 and composed of a sync signal, address data and an ECC for the address data, pre-encodes the address information and supplies it to the modulator 3. At the same time, the carrier signal generator 2 generates a carrier signal which is to carry the address information, and supplies the signal to the modulator 3.

In step S2, the modulator 3 makes MSK modulation of the carrier signal supplied from the carrier signal generator 2 on the basis of the pre-encoded address information supplied from the address generator 1, and supplies a resultant MSK modulation signal to the wobbling unit 4.

Next in step S3, the wobbling unit 4 forms, on the optical disc 5, a spiral groove wobbled adaptively to the MSK modulation signal supplied from the modulator 3.

With the above address recording operations made by the address recording apparatus, address information can be generated by including, in a sync signal, four different sync unit patterns any one of which makes it possible to locate the sync signal when it can be detected and there can be formed on the optical disc 5 a groove wobbled adaptively to an MSK modulation signal corresponding to the address information thus generated.

Thus it is possible to provide an optical disc 5 in which an address can be accessed with an extremely high accuracy. Therefore, since no useless area such as link area has to be provided in a data recording area, an optical disc 5 can be provided of which the data recording area can be used effectively.

Figure 13:
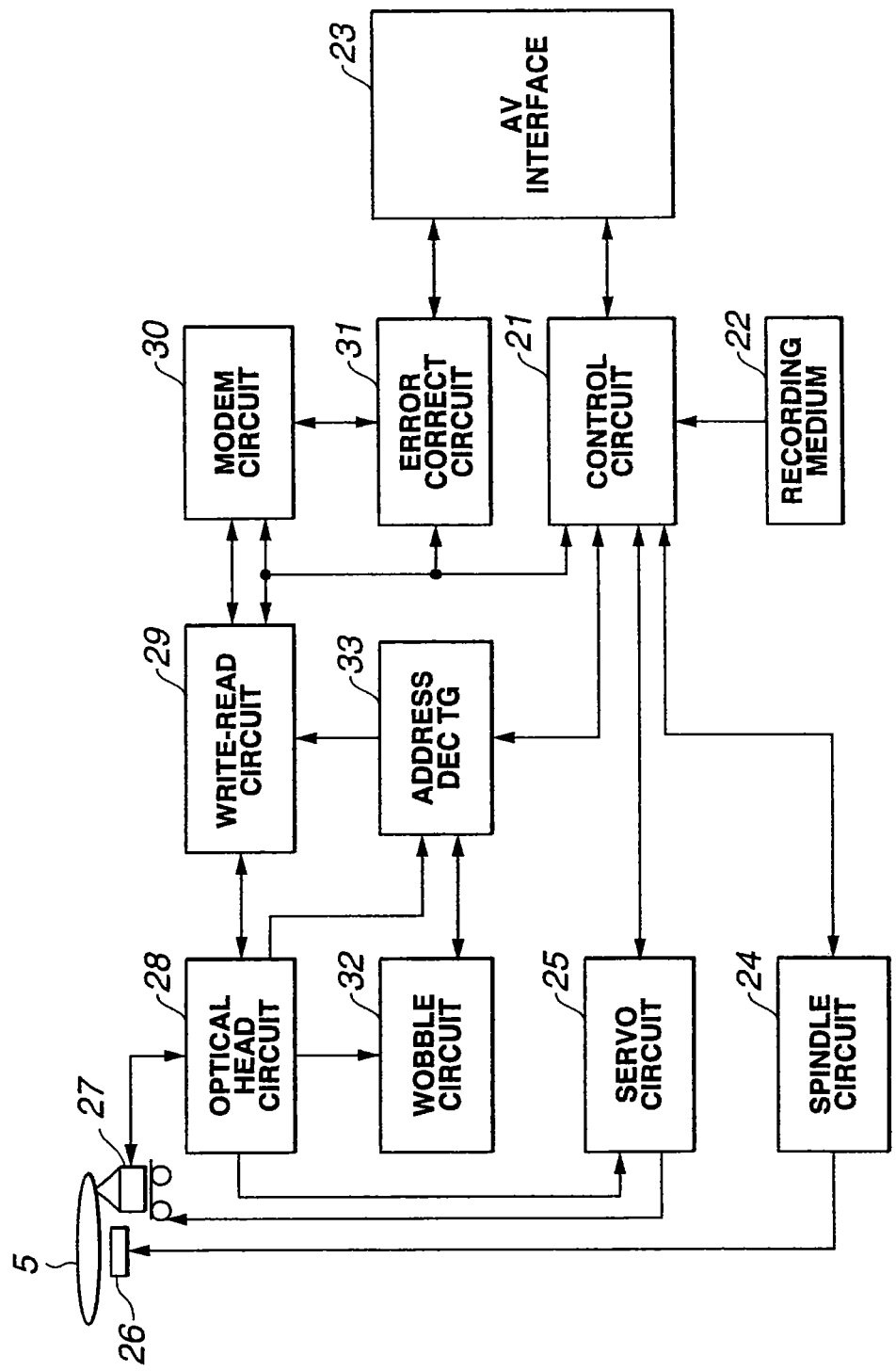
FIG. 13 is a block diagram of an optical disc drive for reproducing address information from an optical disc.

Referring now to FIG. 13, there is schematically illustrated in the form of a block diagram a concrete example of the construction of an optical disc drive which writes and reads arbitrary data to and from the optical disc 5 having address information written as wobbles of a groove thereon by the address recording apparatus according to the present invention.

As shown in FIG. 13, the optical disc drive includes a control circuit 21 which controls components of the optical disc drive according to a control program recorded in a recording medium 22. More specifically, the control circuit 21 controls the components of the optical disc drive according to a write command supplied from an external AV apparatus or the like (not shown) via an AV interface 23 to write; to the optical disc 5, a mark corresponding to recording data supplied from the AV apparatus. Also, the control circuit 21 controls the optical disc drive components to read a mark recorded in the optical disc 5 according to a read command supplied from the AV apparatus via the AV interface 23, reproduce the recorded data, and supply it to the AV apparatus via the AV interface 23.

The optical disc drive includes also a spindle circuit 24 to control the rotation of a spindle motor 26 according to a command from the control circuit 21, and a servo circuit 25 to cause an optical pickup 27 to seek an address specified by the control circuit 21 and control the focus servo and tracking servo of the optical pickup 27 according to a focus error signal and tracking error signal supplied from an optical head circuit 28. The spindle motor 26 rotates the optical disc 5 under the control of the spindle circuit 24.

The optical pickup 27 consists of a laser output system, return line detecting system, biaxial actuator, etc. For data recording, the optical pickup 27 is controlled by the optical head circuit 28 to radiate laser light to the optical disc 5, thereby forming a mark on the optical disc 5. For data reproduction, the optical pickup 27 radiate laser light onto the optical disc 5, detects return light from the optical disc 5 and generate a corresponding return light signal, and supplies it to the optical head circuit 28.

For data recording, the optical head circuit 28 controls the laser output from the optical pickup 27 correspondingly to a header signal or write-compensated signal supplied from the write-read circuit 29. For data reproduction, the optical head circuit 28 generates an RF signal corresponding to an embossed pit and mark recorded on the optical disc 5 on the basis of the return light signal from the optical pickup 27, and supplies the RF signal to the write-read circuit 29. Further, for data reproduction, the optical head circuit 28 generates a focus error signal and tracking error signal on the basis of the return light signal from the optical pickup 27, and supplies it to the servo circuit 25 which will then generate a pushpull (will be referred to as "pp" hereunder) signal. The pp signal is supplied to a wobbling circuit 32.

For data recording, the write-read circuit 29 is controlled by the control circuit 21 to make write compensation of a signal supplied from a modem circuit 30 and supply the compensated signal to the optical head circuit 28. For data reproduction, the write-read circuit 29 converts the RF signal from the optical head circuit 28 into binarized data and supplies the data to the modem circuit 30.

For data recording, the modem circuit 30 is controlled by the control circuit 21 to modulate ECC-added recording data supplied from an error correction circuit 31 and supply the resultant signal to the write-read circuit 29. For data reproduction, the modem circuit 30 demodulates the binarized data supplied from the write-read circuit 29 and supplies the resultant read data to the error correction circuit 31.

For data recording, the error correction circuit 31 is controlled by the control circuit 21 to add an error correction code (ECC) to the recording data supplied from the external AV apparatus or the like via the AV interface 23, and supplies the data to the modem circuit 30. For data reproduction, the error correction circuit 31 corrects any error of read data supplied from the modem circuit 30 on the basis of the ECC, and supplies the corrected data to the external AV apparatus or the like via the AV interface 23.

The wobbling circuit 32 generates and demodulates a wobbling signal (equal to the MSK modulation signal including a noise component) corresponding to wobbles of a groove on the basis of the pp signal supplied from the optical head circuit 28, and supplies the recovered address information (including a sync signal, address data and error correction code for the address data) to a address decoder/timing generator (DEC/TG) 33.

The DEC/TG 33 detects the position of a sync part by detecting at least one of the four different sync unit patterns included in the sync part from the address information supplied from the wobbling circuit 32, generates an address based on address data and ECC for the address data included in a data part next to the sync unit, and supplies the address to the control circuit 21. Also, the DEC/TG 33 generates a timing signal on the basis of the detected sync part, and supplies the timing signal to various circuits in the optical disc drive via the control circuit 21.

Next, how the wobbling circuit 32 recovers address information by demodulating a wobbling signal will be described with reference to FIGS. 14 and 15.

First, use of the DMSK modulation for the MSK modulation will be described herebelow. Address information as original data shown in FIG. 14A is made a signal "Mod data" as shown in FIG. 14B by a differential encoding as the pre-encoding, it is then subjected to MSK modulation and recorded as an MSK modulation (DMSK modulation) signal as shown in FIG. 14C on the optical disc 5.

The wobbling circuit 32 generates a wobbling signal (DMSK modulation signal including a noise component) from the pp signal, and extracts a carrier signal as shown in FIG. 14D from the wobbling signal. Then, the wobbling circuit 32 generates a signal "Demod out" as shown in FIG. 14E by multiplying the wobbling signal by the carrier signal, removes the noise component from the signal by means of an incorporated lowpass filter or the like to generate a signal "LPF out" as shown in FIG. 14F.

Note that the factor of the lowpass filter (e.g., 27-tap FIR filter) incorporated in the wobbling circuit 32 is as follows by way of example. The sampling frequency is eight times higher then the wobbling frequency.

$-0.000640711$
$-0.000865006$
$0.001989255$
$0.009348803$
$0.020221675$
$0.03125$
$0.040826474$
$0.050034929$
$0.05852149$
$0.065960023$
$0.072064669$
$0.076600831$
$0.079394185$
$0.080337385$ (center)
$0.079394185$
$0.076600831$
$0.072064669$
$0.065960023$
$0.05852149$
$0.050034929$
$0.040826474$
$0.03125$
$0.020221675$
$0.009348803$
$0.001989255$
$-0.000865006$
$-0.000640711$ Further, the wobbling circuit 32 binarizes the signal "LPF out" to provide a signal "Demod data" as shown in FIG. 14G. This signal is subjected to NRZ conversion to recover a signal (pre-encoded address information) as shown in FIG. 14H.

Next, use of the GDMSK modulation for the MSK modulation will be described. Address information as original data shown in FIG. 14A is made a signal as shown in FIG. 15A by a differential encoding as the pre-encoding, the resultant signal is passed through a Gausian filter to provide a signal "Mod data" as shown in FIG. 15B, and then the signal "Mod data" is subjected to DMSK modulation and recorded as an MSK modulation (GDMSK modulation) signal as shown in FIG. 15C on the optical disc 5.

The wobbling circuit 32 generates a wobbling signal (GDMSK modulation signal including a noise component) from the pp signal, and extracts a carrier signal as shown in FIG. 15D from the wobbling signal thus generated. Then, the wobbling circuit 32 generates a signal "Demod out" as shown in FIG. 14E by multiplying the wobbling signal by the carrier signal, removes the noise component from the signal by means of an incorporated lowpass filter or the like to generate a signal "LPF out" as shown in FIG. 14F.

Further, the wobbling circuit 32 binarizes the signal "LPF out" to provide a signal "Demod data" as shown in FIG. 15G. This signal is subjected to NRZ conversion to recover a signal (pre-encoded address information) as shown in FIG. 15H.

As having been described in the foregoing, the optical disc drive can detect the position of a sync part by detecting at least one of the four types of sync unit patterns included in the sync part. Thus, it is possible to acquire address data and ECC for the address data included in a data part next to the sync part and generate an address from the address data and ECC. So, it is possible to improve the address error rate for reproduction of data and accurately access a given-address on the optical disc 5.

Also, according to the present invention, since the second signal of the MSK modulation signal has a frequency 1.5 times higher than that of the first signal (carrier signal), the range of a frequency to be detected in the wobbling circuit 32 is very narrow. Thus, the bandwidth of a frequency to be reproduced can be narrowed. Further, the S/N (signal-to-noise) ratio can be improved for the error rate of an address to be lower.

Note that the present invention may be applied for recording and reproducing address information to and from the optical disc 5 as well as from disc-shaped recording media of all types.

The aforementioned series of operations can be carried out by a hardware, and also by a software. In the latter case, a program forming the software is installed from a recording medium in a computer having dedicated hardware for execution of the program or in a general-purpose personal computer, for example, which can execute various functions by installing a variety of programs.

As shown in FIG. 1, the recording medium is not only a package medium such as a magnetic disc 8 (including a floppy disc), optical disc 9 (CD-ROM (=compact disc—read-only memory), DVD (digital versatile disc), magneto-optical disc 10 (including mini disc (MD)) or a semiconductor memory 11, distributed to the users for serving the program and having the program recorded therein, but a ROM or hard disc built in a computer in advance and having the program recorded therein.

Note that in the present invention, the steps of describing the program to be recorded in a recording medium include, of course, operations made time-serially in the described order of them, and also operations made not time-serially but in parallel or individually.

INDUSTRIAL APPLICABILITY

As having been described in the foregoing, the address information recording apparatus and method and the first program according to the present invention are such that an MSK modulation signal is generated by making MSK modulation of a carrier signal correspondingly to address information composed of a sync signal including a plurality of sync unit patterns, address data and an error correction code of the address data and there is formed a spiral groove wobbled adaptively to the MSK modulation signal thus generated. Thus, it is possible to record, to the disc medium, address information which permits accurate detection of the position of the sync signal.

Also, the address information reproducing apparatus and method and the second program according to the present invention are such that an MSK modulation signal is extracted by removing a noise component from a generated wobbling signal and the MSK modulation signal thus extracted is demodulated to recover address information composed of a sync signal including a plurality of sync unit patterns, address data and an error correction code of the address data. Thus, it is possible to access a given address quickly and accurately.

Since the disc medium according to the present invention has formed thereon a spiral groove wobbled adaptively to an MSK modulation signal correspondingly to address information composed of a sync signal including a plurality of sync unit patterns, address data and an error correction code of the address data, it is possible to access a given address quickly and accurately.

The invention claimed is:

1. An apparatus for recording address information to a disc medium, the apparatus comprising:
   means for generating address information including a sync signal part, the sync signal part including a plurality of consecutive sync blocks, each sync block including a monotone bit followed by a sync bit, and a data part including address data, wherein the address data is formed of a plurality of consecutive ADIP (address in pre-groove) blocks, each ADIP block including a single first bit followed by a plurality of ADIP bits;
   means for making MSK modulation of a carrier signal correspondingly to the address information generated by the address information generating means to generate an MSK modulation signal; and
   means for forming, on the disc medium, a spiral groove wobbled adaptively to the MSK modulation signal generated by the modulating means,
   wherein the address data consists of fifteen ADIP blocks.

2. A method for recording address information to a disc medium, the method comprising:
   generating address information including a sync signal part, the sync signal part including a plurality of consecutive sync blocks, each sync block including a monotone bit followed by a sync bit, and a data part including address data, wherein the address data is formed of a plurality of ADIP (address in pre-groove) blocks, each ADIP block including a single first bit followed by a plurality of ADIP bits;
   making MSK modulation of a carrier signal correspondingly to the address information generated by the address information generating means to generate an MSK modulation signal; and
   forming, on the disc medium, a spiral groove wobbled adaptively to the MSK modulation signal generated by the modulating,
   wherein the address data consists of fifteen ADIP blocks.

3. A disc medium manufactured by a method for manufacturing a disc medium including recording address information, the method comprising:
   generating address information including a sync signal part, the sync signal part including a plurality of consecutive sync blocks, each sync block including a monotone bit followed by a sync bit, and a data part including address data, wherein the address data is formed of a plurality of ADIP (address in pre-groove) blocks, each ADIP block including a single first bit followed by a plurality of ADIP bits;
   making MSK modulation of a carrier signal correspondingly to the address information generated by the address information generating means to generate an MSK modulation signal; and
   forming, on the disc medium, a spiral groove wobbled adaptively to the MSK modulation signal generated by the modulating,
   wherein the address data consists of fifteen ADIP blocks.

4. A reproducing apparatus for reproducing address information from a disc medium, the apparatus comprising:
   means for reading, from the disc medium, a spiral groove wobbled adaptively to a MSK modulation signal;
   means for making MSK demodulation of a carrier signal correspondingly to address information from the MSK demodulation signal; and wherein the address information includes a sync signal part, the sync signal part including a plurality of consecutive sync blocks, each sync block including a monotone bit followed by a sync bit, and a data part including address data, wherein the address data is formed of a plurality of ADIP (address in pre-groove) blocks, each ADIP block including a single first bit followed by a plurality of ADIP bits, wherein the address data consists of fifteen ADIP blocks.

5. A method for reproducing address information from a disc medium, the method comprising:

reading, from the disc medium, a spiral groove wobbled adaptively to a MSK demodulation signal;

making MSK demodulation of a carrier signal correspondingly to address information from the MSK demodulation signal; and wherein the address information includes a sync signal part, the sync signal part including a plurality of consecutive sync blocks, each sync block including a monotone bit followed by a sync bit, and a data part including address data, wherein the address data is formed of a plurality of ADIP (address in pre-groove) blocks, each ADIP block including a single first bit followed by a plurality of ADIP bits, wherein the address data consists of fifteen ADIP blocks.

* * * * *